United States Patent [19]

Marshall et al.

[11] 4,105,887
[45] Aug. 8, 1978

[54] WELDING APPARATUS AND METHOD

[75] Inventors: Denis John Marshall, Ware; Terry Martin Mohin, Woodgate End Nr Broxted, both of England

[73] Assignee: BOC Limited, London, England

[21] Appl. No.: 652,742

[22] Filed: Jan. 27, 1976

[30] Foreign Application Priority Data

Nov. 18, 1975 [GB] United Kingdom ............... 47498/75

[51] Int. Cl.² .............................................. B23K 9/16
[52] U.S. Cl. ..................................... 219/72; 61/69 R; 61/105; 219/74; 61/82
[58] Field of Search ................ 219/121 EB, 121 EM, 219/121 P, 72, 75, 70, 61, 69, 117, 50, 137 R; 114/16 R, 16.8; 61/69 A, 69 R, 70, 82, 85; 312/236

[56] References Cited

U.S. PATENT DOCUMENTS

| | | | |
|---|---|---|---|
| 908,095 | 12/1908 | Hassan | 219/72 |
| 2,939,292 | 6/1960 | Law | 61/82 |
| 3,327,616 | 6/1967 | Ozymy | 312/236 |
| 3,343,324 | 9/1967 | Gordon | 61/69 R X |
| 3,386,254 | 6/1968 | Connally | 61/69 |
| 3,581,042 | 5/1971 | Pilia | 219/61 |
| 3,876,852 | 4/1975 | Topham | 219/137 R X |

FOREIGN PATENT DOCUMENTS

417,257 7/1974 U.S.S.R. .................................. 219/72

Primary Examiner—J. V. Truhe
Assistant Examiner—Mark H. Paschall
Attorney, Agent, or Firm—Dennison, Dennison, Meserole & Pollack

[57] ABSTRACT

An underwater pipeline is repaired by cutting away a defective section thereof and replacing the defective section with another length of pipe. The replacement is joined to the exposed ends of the pipeline by welded ball-and-socket joints. Those welds that it is necessary to perform under water are made in a gaseous environment created in a chamber having an open base through which water may be displaced by gas and at least one transparent side panel which is displaceable to form a gap in the side of the chamber. A diver may insert a welding gun or welding rod through this gap. The chamber has outer tubular flanges which receive the lengths of pipe extending through the chamber. Tubular members of flexible or elastomeric material are used to seal each flange to the length of pipe passing there through. Each tubular member of flexible or elastomeric material is positioned around the flange and length of pipe which it is to seal. One end of the member is clamped around the flange and the other end is clamped around the pipe.

2 Claims, 10 Drawing Figures

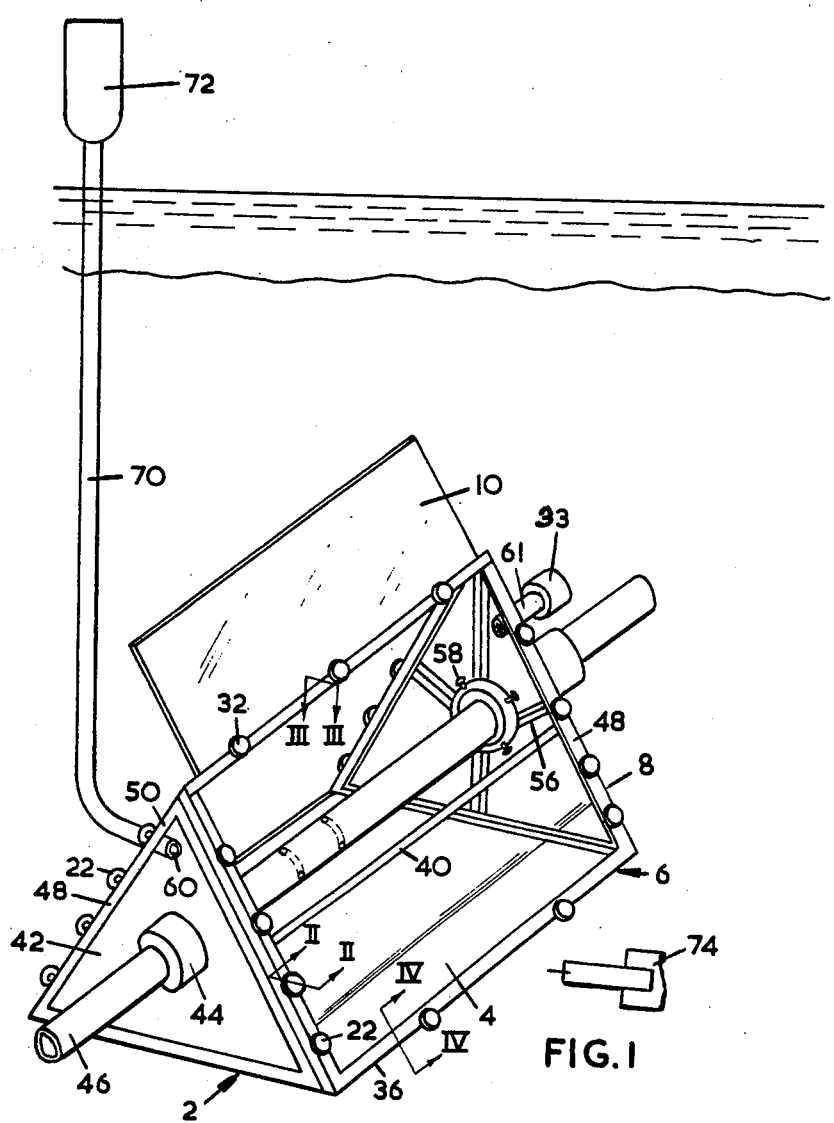
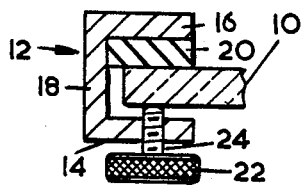
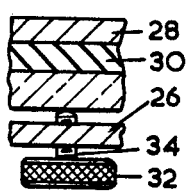
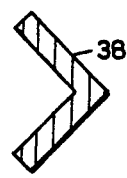
FIG. 1
FIG. 2    FIG. 3    FIG. 4

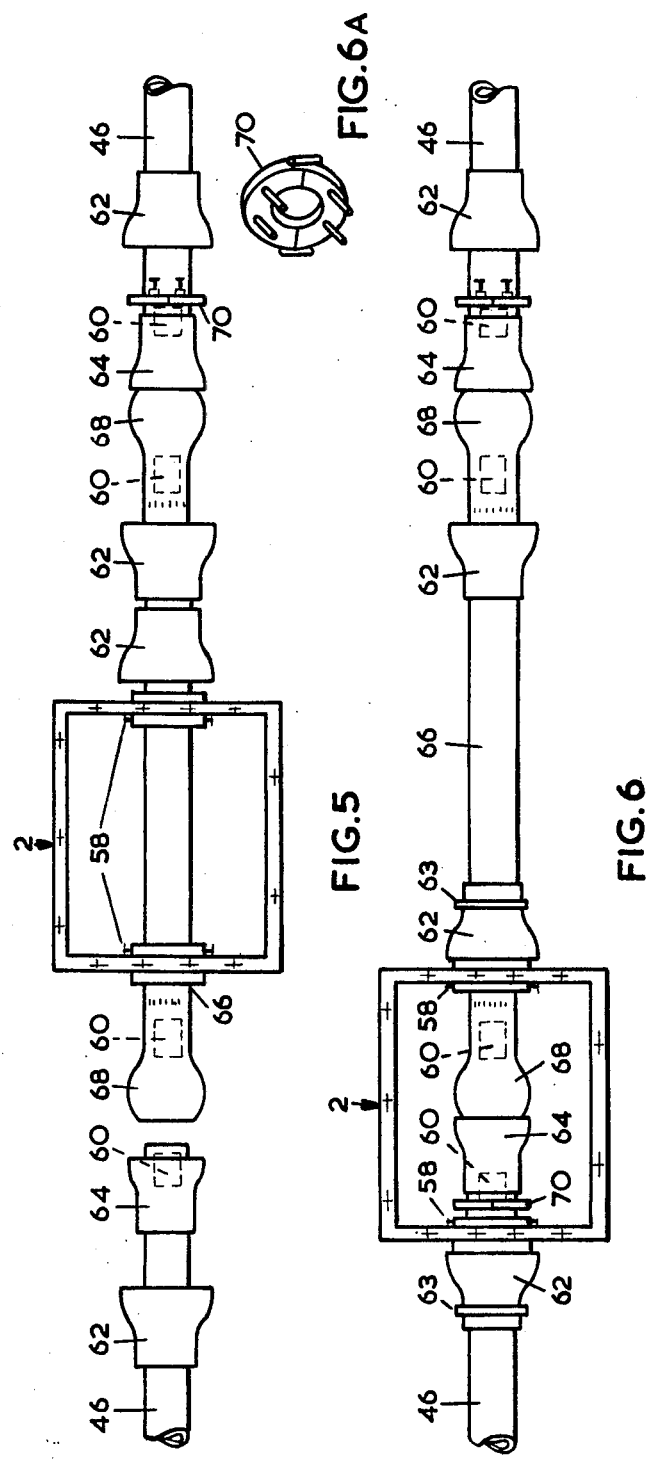

WELDING APPARATUS AND METHOD

If the structure to be welded comprises, for example, two lengths of pipe to be joined circumferentially together the diver may experience difficulty in manipulating his welding torch or welding rod into a convenient position for welding around the upper part of the circumference.

The chamber has for example been used in the repair under water of vertical risers. It has also been proposed to use such a chamber having an open base in the underwater welding of lengths of pipe. For this purpose it is necessary for the chamber to have in opposites sides thereof apertures through which lengths of pipe to be joined end-to-end are able to be passed.

Certain problems have needed to be overcome in order to be able to use the chamber in practice when welding underwater.

One particular problem concerns the formation of water-tight seals between the walls defining the apertures in the sides of the chamber and the pipes passing there through. When repairing a pipeline under water it is customary to cut away a defective or damaged part of the line and replace it with a piece of pipe cut from a spool above water. In general, it is found that the exposed ends of the pipeline are not horizontal and in consequence the pipes entering the chamber are likely to have their longitudinal axes at an angle to the axes of the apertures in the sides of the chamber. Thus the method of sealing needs to be capable of catering for the misalignment of the pipe and apertures. Although it is possible for mechanical seals to cater for this misalignment, very careful design and asssembly of the seal is required.

It is possible to use an adhesive or like sealing compound to seal the pipes to the walls of the apertures. However, it is generally desirable to move the same chamber along the pipeline to make all the necessary welds.

If therefore a sealing compound is used difficulties will arise in breaking the seal when it is required to reposition the chamber.

Another way of making the seal between the pipes and the walls defining the apertures is to fit the pipes with annular end plates or flanges. However, such plates need to be carefully dimensioned and not able to cater for pipes with different diameters.

BACKGROUND OF THE INVENTION

1. Field of the Invention

This invention relates to a welding apparatus and a welding method. In particular, it relates to a method of and apparatus for welding under water.

2. Description of the prior art

In a proprietary process for welding under water a chamber is fitted about the structure to be welded. This chamber has an open base and may be of any convenient shape. By passing pressurized gas into the chamber water may be expelled therefrom by the pressurised gas thus creating a gas space therein. A welding operation may then be performed in the gas space without the presence of water causing a large concentration of hydrogen to be occluded in the weld metal. In order to weld a diver inserts a welding gun or welding rod into the gas space and strikes an arc between the electrodes and the work to be welded. The walls of the chamber are formed at least in part of a transparent material, such as Perspex, to enable the diver to see what he is doing when he is welding. This chamber is known as the HydroBox chamber. ("HydroBox" is a Trade Mark).

THE INVENTION

The present invention aims at providing apparatus and method for facilitating a welding operation in which the diver might find it difficult to complete the weld with a welding rod or welding torch inserted into the interior of the chamber from the open base thereof.

It is a further aim of the present invention to provide a simple but effective method for making a seal between a length of pipe and the wall or walls defining an aperture in a chamber into which the pipe passes through the aperture. Another object of the present invention is to provide an effective method of repairing a pipeline under water.

According to the present invention there is provided apparatus for welding under water comprising a chamber having means to secure it to an underwater structure, wherein the chamber has an open base whereby when it is secured to the structure and when gas is passed into the chamber water is displaced therefrom through the open base and a gas space is created therein, and wherein the chamber has a side panel which is formed at least in part of transparent material and which is sealingly engageable within a frame in a gas-tight manner, the panel being movable relative to the frame to make an opening in the frame through which a welding rod or welding gun may be inserted into the space within the chamber.

The invention also provides a method of welding under water including the steps of securing a chamber having an open base to an underwater structure to be welded, the chamber also having a side panel which is formed at least in part of transparent material and which is sealingly engaged in a gas-tight manner within a frame, the panel being movable relative to the frame to make an opening through the frame; passing gas into the interior of the chamber to displace water therefrom and to create a gas space therein; inserting a welding gun or welding rod into the gas space therein and starting the weld; withdrawing the rod or gun from the gas space; moving the panel relative to its frame to make an opening through the frame, the opening being of sufficient size to permit the gun or rod to be inserted therethrough into the gas space but the uppermost region of the opening being below the part of the structure still to be welded; inserting the welding rod or welding gun through the frame, and continuing to weld.

The panels preferably slide in the frame. In this arrangement the frame may include two spaced-apart upwardly-extending channels facing each other. A resilient sealing strip is preferably positioned inwardly of the panel and extends from end to end along each channel between the panel and a side wall of the channel. Clamping screws or other clamping means preferably urge the panel towards the sealing strips thereby compressing the strips and making a seal between the panel and the channels. When it is desired to slide the panel along the channels to create an opening through the frame, the clamping screws may be loosened to permit the panel to move freely along the channels. The panel may then be moved a chosen distance along the channels and then be fixed in a new position by retightening the clamping screws.

There is preferably through one of the walls of the chamber an outlet which is positioned to communicate with the gas space inside the chamber and which has in it a manually operable valve. The outlet desirably communicates with an upper region of the gas space inside the chamber. When it is desired to move the panel relatively to the frame to make an access opening therethrough the valve may be opened so as to allow gas to escape from the chamber and water to take its place. This reduces the differential pressure across the chamber and therefore lessens any difficulty caused by the differential pressure in sliding the panel in an upward direction. The valve and the outlet are preferebly of sufficient size to permit gas to be exhausted quickly from the chamber.

If desired, the frame may include upper cross-members extending across from the top of one channel to the top of the other. The panel passes between the cross members, the cross member adjacent to the outer face of the panel carrying clamping screws or other clamping means which are adapted to engage the panel and urge it against the other cross member. If desired an elastomeric sealing member may be engaged between the inner cross member and the panel. Loosening the clamping screws carried by the outer cross-member enables the pressure it exerts against the panel to be released and enables the panel to be moved along the channels provided that the clamping screws carried by the channels are also loosened.

The chamber preferably has two slidable panels which should normally occupy opposite sides of the chamber. The chamber may be of any convenient shape. If the chamber is to be used in the welding together under water of two lengths of generally horizontally disposed pipe it may taken the form of a triangular prism having an open base, with the lengths of pipe extending through the triangular side walls thereof. A triangular prismatic chamber offers two advantages. First, it may be of relatively simple construction. Second, the sloping transparent panels afford a diver a good view of the weld when he is welding in the down hand position.

The, or each, panel is preferably formed of a transparent material such as perspex.

If the panel or panels are particularly long it may be desirable to have a pair of cross-members extending perpendicularly to the channels across the frame from a region intermediate the ends of one channel to the other channel, the panel extending between these intermediate cross-members. Alternatively a single cross-member may be used. This arrangement helps to guard against the possibility of the panel becoming bowed.

The bottom edge of the, or each, panel is preferably able to be received in a support angle secured to or forming out of a cross-member extending across from the bottom of one channel to the bottom of the other. This helps to prevent the panel from becoming bowed when it is in its closed position.

When welding together two horizontal lengths of pipe a diver may insert the welding rod or welding gun through the open base of the chamber into the gas space created within the chamber. He will then strike an arc between the work to be welded and the welding rod or welding gun. He may find it inconvenient to weld above the centre of the pipe. Using the apparatus and method according to the invention he can then raise one of the panels of the chamber to provide an access opening through the side of the chamber. The choice of the height of this opening is at the discretion of the diver. It is preferred, however, for the diver to open the valve to exhaust gas from the chamber before raising the panel. When the panel has been raised gas may be passed into the chamber to recreate the gas space. The diver may then reinsert his welding rod or welding torch into the gas space through the access opening provided by raising the panel. Welding may then recommence.

The diver may find it convenient to weld only around a part of the pipe adjacent to the open side of the chamber. If this is so to complete the weld he may simply open the valve, lower the raised panel and secure it again in its lowermost position, move round to the opposite panel, unclamp it, raise it a chosen height, secure it again, close the valve, pass gas into the chamber to recreate the gas space and insert the welding rod or welding gun into the gas space and complete the weld.

In an alternative form of chamber according to the present invention the movable panel is in the form of a hinged door which is mounted in the frame, which is movable away from and back toward the frame and which forms a lower or intermediate part of one of the sides of the chamber. Preferably sealing strips are engaged between the top and sides of the door and the respective parts of the frame. The door will normally be of transparent material such as Perspex. The chamber may be of any convenient shape, for example, cuboid. If desired doors may be formed in opposite faces of the chamber.

This form of chamber is particularly suitable when welding along a long vertical path. In the lower region of the path the diver may insert his welding gun or welding rod through the open base into the gas space inside the chamber. However, to gain access to the upper region of the path above the top of the door, the diver may open the door and insert his welding gun or welding rod therethrough into the gas space inside the chamber.

According to a further aspect of the present invention, there is provided a method of making a dismantlable seal between a pipe and a tubular member which has an internal diameter greater than the external diameter of the pipe and which projects from and communicates with the interior of a chamber having an open base out of which water may be displaced by passing gas into the chamber, the method including the steps of:

(i) fitting over the end of the pipe a hollow open-ended member of flexible or elastomeric material;
(ii) moving the chamber into a position in which the end of the pipe lies within the tubular member;
(iii) clamping one end of the hollow open-ended member to the pipe and clamping the other end of the hollow open-ended member to the outer surface of the tubular member.

The hollow open-end member is preferably formed of larger internal and external diameter at one of its ends than at the other.

The invention also provides a method of repairing an underwater pipeline including the steps of:

(i) cutting away a damaged section of the pipeline;
(ii) sealing the ends of the pipeline that are exposed when the damaged section is cut away;
(iii) above water locating on a length of replacement pipe a chamber having an open base, in a pair of opposite side walls apertures which face each other, an outer tubular flange associated with each aperture, and means for clamping the chamber to the replacement pipe when the replacement pipe extends through the said apertures;

(iv) above water, welding to each end of the replacement pipe, an open-ended hollow member having a part-spherical surface adapted to be mated with a complementary member to form a ball-and-socket joint;

(v) above water sealing the ends of the replacement pipe;

(vi) lowering the replacement pipe underwater and positioning it between the exposed ends of the pipeline.

(vii) fitting on the exposed ends of the replacement pipe open-ended hollow members having part-spherical surfaces complementary to the open-ended hollow members welded to the replacement pipe;

(viii) sliding the chamber along the replacement pipe and passing one of the apertures over the hollow open-ended members at one end of the pipeline adjacent thereto;

(ix) clamping one end of the chamber to the pipeline and the other end of the chamber to the replacement pipe;

(x) sealing the outer tubular flanges of the chamber to the pipe passing therethrough by clamping on each flange one end of a tubular sealing member of flexible or elastomeric material, and clamping the other end of seal sealing member to the pipe passing therethrough;

(xi) passing gas into the chamber to displace water therefrom through its open base and to create a gaseous environment therein;

(xii) unsealing the ends of the pipeline and the replacement pipe that are in the chamber;

(xiii) welding the open-ended hollow member on the exposed end of the pipe that is in the gaseous environment in the chamber to the exposed end, and then welding this open-ended hollow member to the adjacent complementary open-ended hollow member on the replacement pipe to form a welded ball-and-socket joint between one exposed end of the pipeline and the replacement pipe;

(xiv) unclamping the chamber and then repeating steps (viii) to (xiii) at the other end of the replacement pipe.

The apparatus and method according to the invention will now be described by way of example with reference to the accompanying drawings of which:

FIG. 1 is a schematic view, partly in perspective, of one form of apparatus according to the present invention.

FIG. 2 is a section through the line II — II of FIG. 1;

FIG. 3 is a section through the line III — III of FIG. 1;

FIG. 4 is a section through the line IV — IV of FIG. 1;

FIGS. 5 and 6 are schematic side views illustrating the installation under water of the apparatus according to the present invention;

FIG. 6A is a perspective view of the split collars shown in FIGS. 5 and 6.

Figure 7:
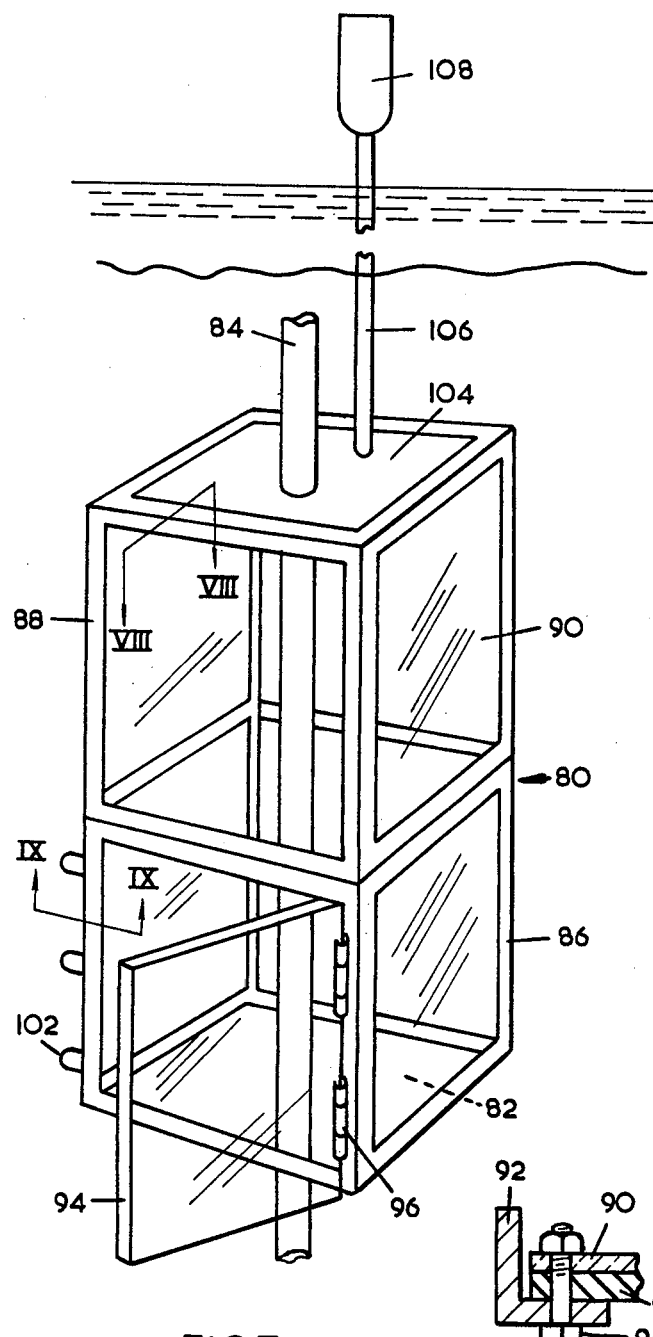
FIG. 7 is a schematic, partly perspective, view of another form of apparatus according to the present invention.

Referring to FIGS. 1 to 4 of the accompanying drawings, a chamber 2 is a triangular prism in shape and has an open base 4. The sloping sides 6 are rectangular and each comprises a metal frame 8 in which a panel 10 is mounted. Both panels 10 are of transparent plastics material.

Each frame 8 has a pair of opposite vertical channels 12 (as shown in FIG. 2). The panels 10 are mounted in their respective frames 8 such that they are free to be moved along the channels 12. Each channel 12 when viewed in section has walls 14 and 16 extending perpendicularly from a wall 18. Between the walls 14 and 16 is situated the panel 10. The wall 14 is adjacent and extends parallel to the outer face of the panel 10. The wall 16 is adjacent and extends parallel to the inner face of the panel 10. An elastomeric sealing strip 20 is bonded to the inner face of the wall 16. This sealing strip extends from end to end of its respective channel. Clamping bolts 22 with screw-threaded shanks 24 pass through the wall 14 of each channel 12 and are adapted to urge the panel 10 inwardly against the sealing strip 20 thereby forming a seal against the ingress of water into the interior of the chamber 2.

Each frame 8 also has an upper pair of cross-members 26 and 28 positioned at the top of the prismatic chamber 2 and extending across from one of its channels 12 to the other. The cross-members 26 and 28 are shown in section in FIG. 3. The panel 10 is received therebetween and a sealing strip 30 is bonded along the entire length of the inner face of the member 28. Clamping bolts 32 with screw-threaded shanks 34 pass through the cross-members 26 and are adapted to urge the panel inwardly against the sealing strip 30 thereby forming a seal against the ingress of water into the interior of the chamber.

Joined to the bottom of each respective pair of channels 12 is a lower cross-member 36 which comprises an angle piece 38 as shown in FIG. 4. The angle piece 38 is adopted to receive the bottom face of the panel 10 associated therewith when the panel is in its lowermost position.

If desired, a single cross-member 40, or a pair of cross-members 40, located one on either side of each panel 10, may be welded to each pair of channels 12 and may extend parallel to the cross-members 26 and 28 at the top of the chamber. The cross-members 40 help to prevent the panels 10 from becoming severely bowed.

The triangular sides 42 of the prismatic chamber extend parallel to one another and each has a tubular flange 44 adapted to receive a length of pipe 46. Each side 42 is constructed from a triangular frame 48 whose sides 50 and 52 are of equal length and a panel 54 which can be welded or otherwise joined to the frame 48.

At the top of one of the sides 42 of the chamber is an outlet 61 which is in communication with the gas space in the chamber and which has a manually operable valve 33 disposed therein.

Each flange 44 extends both inwardly and outwardly of its associated panel 54. In order to help support the weight of the pipe, struts 56 extend outwardly from the outer surface of an inner part of each flange 44 and are joined to the triangular frame 48. If desired, these support struts may be welded to each frame 48 and its associated flange 44.

Each tubular flange 44 has centralising screws 58 extending radially inwards. By making appropriate adjustments to these screws a degree of axial misalignment of the pipe may be catered for.

In order to permit pressurised gas to be passed into the interior of the chamber 2 an inlet 60 is formed in one of the panels 54. In order to fabricate the chamber 2 the respective frames may be made from suitable shaped pieces of iron or ferrous metal. These frames may then be welded together to form a unitary article. The panels may then be mounted to the frames.

The manner in which the chamber 2 may be used in the repair of a pipeline under water is illustrated in FIGS. 5 and 6 of the accompanying drawing. A damaged section of the pipeline 46 is cut out and the exposed ends and the inside of the pipe are dressed and cleaned. Inflatable elastomeric stops 60 are inserted in the exposed ends of the pipeline 46 and are then inflated so as to form a water-tight seal. Tubular, elastomeric, open-ended boots 62 having narrower and wider ends and tubular socket members 64 are slid onto the exposed ends of the pipeline. A piece of replacement pipe 66 is cut from a spool on the surface above the water. Inflatable elastomeric stops are inserted in the ends of the pipe 66 and then inflated. The chamber 2 is slid onto this piece of pipe. Two elastomeric boots 62 are then slid onto the replacement pipe 66 on the right hand side (as shown) of the chamber. Tubular ball members 68 adapted to form ball and socket joints with the socket members 64 are then welded to the ends of the pipe 66. The replacement 66 is then lowered into position underwater (see FIG. 5). Split collars 70 (only one shown in FIG. 5) are then clamped onto the respective ends of the pipeline 46 in a position between the boots 62 and the socket members 64. The split collars 70 are tightened to prevent the free moving sockets 64 from sliding out of position away from the ball members 68.

One of the ball and socket joints is then selected for welding. The chamber 2 is slid over to the first selected joint for welding such that it occupies the position shown in FIG. 6 of the accompanying drawings. The centralising screws 58 are then tightened so as to fix the chamber 2 in this position. The narrower end of the boot 62 that is positioned on the pipeline 46 is then clamped to the pipeline 46 by means of a Jubilee clip 63. The wider end of this boot is clamped by another Jubilee clip 63 to the flange 44 adjacent thereto. By this means a water-tight seal is formed between the pipeline 46 and the chamber 2. Analogously, a water-tight seal between the chamber 2 and the replacement pipe 66 is formed by clamping the narrower end of the left hand side boot 62 (as shown) on the pipe 66 thereto and by clamping its wider end to the flange 44 adjacent thereto.

The ball and socket joint can then be welded. Referring again, now, to FIGS. 1 and 4 of the accompanying drawings, the inlet 60 may be connected by a conduit 70 to a source of pressurised gas 72 (indicated schematically in FIG. 1) located above water. With the panels 10 in their lowermost position gas (e.g. argon) is passed into the chamber 2 to purge gas therefrom and to create a gas space therein. The stops 60 within the chamber 2 may then be deflated and removed. The diver may then insert a welding gun 74 (indicated schematically) through the open base 4 into the gas space therein and strike an arc between the consumable welding electrode in the gun and the pipe to be welded. The socket 64 is first welded to the pipe 46. When the lower part of this weld has been completed the diver may find it inconvenient to reach above the centre of the pipe 46.

The diver can then open the valve 33 to let the chamber fill with water, loosen the clamping bolts 22 and 32, raise one of the panels 10 to the position shown in FIG. 1, retighten the bolts 22 and 32, and close the valve 33. A supply of gas from the source 72 may then be recommended to expel water from the chamber. The level of the water in the chamber 2 will then fall to that of the bottom end face of the panel 10 that has been raised. The diver can then insert the welding gun 74 into the gas space and continue the weld until the uppermost point of the joint to be welded is reached. The diver then withdraws the gun 74, and if desired, loosens the bolts 22 and 32, returns the raised panel 10 to its lowermost position. He then opens the valve 33 and lets the chamber fill with water, raises the other panel 10, by loosening those of the bolts 22 and 32 associated therewith, moving the panel to a chosen position and retightening the bolts 22 and 32. The diver then closes the valve 33 and a supply of gas from the source 72 is restarted to expel water from the chamber. When expulsion of water from the chamber has stopped the gas supply may be shut off or reduced considerably.

The diver then reinserts the gun into the gas space in the chamber and completes the weld.

An analogous procedure may be followed to weld the ball member 68 to the socket member 64. The boots 62 may then be unclamped and the screws 58 loosened. The chamber 2 may then be slid over the two boots on the pipe 66 and the other ball and socket members 68 and 64 respectively and these welded in analogous manner.

By making the boots 62 of elastomeric material it is possible to slide the chamber over the boots. Alternatively, the boots may be cut away.

Another alternative is to form at least one of the boots with a longitudinal gas extending end-to-end thereof. The boot may thus be wrapped around its associated tubular flange and pipe, sealed along the gas and clamped to the flange and pipe. By unsealing the gap and unclamping its ends the boot may be readily removed when desired.

The use of ball and socket members to join the pipe 66 to the exposed ends of the pipeline allows for axial misalignment of the pipeline to be catered for.

Figure 8:
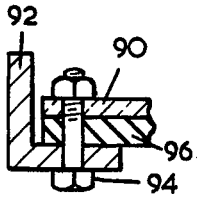
FIG. 8 is a section through the line VIII — VIII of FIG. 7.
Figure 9:
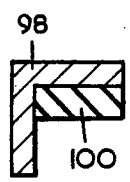
FIG. 9 is a section through the line IX — IX of FIG. 7.

Referring now to FIGS. 7, 8 and 9 of the accompanying drawings a chamber 80 is generally cuboid in shape and has an open base 82. The chamber 80 is positioned under water around a vertical post 84 along which it is desired to make a long vertical weld.

The chamber 80 comprises upper and lower metal frames 86 and 88 which both define cuboids. The frames may be fabricated by welding together suitable pieces of iron, and two frames themselves may be joined together by welding. Within each rectangular space defined by the walls of the upper frame 88 are mounted panels 90 of transparent plastics material. These are mounted in a water tight manner, for example, in the manner shown in FIG. 8. As shown in FIG. 8, each wall of the frame 88 is formed by angle member 92. Engaged by bolts 94 between the angle member and the panel 90 is an elastomeric sealing strip 96. The sealing strip is under a state of compression and thus prevents the passage of water between the panel 90 and the angle member 92. Panels of transparent plastics material may similarly be mounted in the lower frame. However, at least one panel is not so constructed but is hinged. This panel is indicated by the reference 94 in FIG. 7 and the hinges by means of which it is suspended are indicated by the reference 96.

As shown in FIG. 7, the panel 94 forms a door through which access may be gained to the interior of the chamber 80. The part of the framework 86 in which the panel 94 is received is illustrated in FIG. 9. It comprises angle members 98 along which sealing strips 100 are bonded. When the door is in its closed position toggle clamps 102 may be operated to press the panel 94 of transparent plastics material against the strips 100 and thereby form a seal.

The chamber 80 has a gas inlet 104 at the top thereof. In order to weld under water the chamber may be clamped about the post 84 and gas passed into the chamber through the inlet 104 from a conduit 106 connected to a source 108 (illustrated schematically) of pressurised gas situated above water. With the door in its closed position water is expelled from the interior of the chamber 80 and a gas space created therein. A welding gun may then be inserted by a diver into the space through the open base 82. Weld metal is deposited along a part of a chosen path until it becomes difficult for the diver to reach further. However the diver must be able to weld up to the level at which the frame 86 and 88 are joined together.

The weld may be continued by the diver withdrawing the gun from the chamber, opening the door in the chamber thereby allowing the level of the water therein to rise to the level at which the frames 86 and 88 are joined together. The diver may then insert the welding gun through the open door and complete the weld.

It is to be appreciated that a chamber may have more than one door. For example, there may be several separate doors located vertically above one another such that as one part of a weld is completed a diver may close one door through which he has been welding, open another vertically thereabove and continue welding therethrough.

The choice of whether sliding or hinged panels, or both, should be employed and the choice of where such panels should be situated in the chamber should be influenced by a desire to make possible easy access to all regions of the path along which it is required to deposit weld metal. It will be appreciated that arrangements of movable panels other than those described herein with respect to the accompanying drawings are both possible and within the scope of the present invention.

We claim:

1. A chamber in which underwater welding is able to be performed, having:
    (a) means to secure said chamber to an underwater structure;
    (b) walls and an open base, whereby when the chamber is secured to the structure and when gas is passed into the chamber, water is displaced therefrom through the open base and a gas space is created therein;
    (c) a frame including at least two spaced apart upwardly extending channel members facing each other;
    (d) panels engaged in a gas-tight manner with the frame so as to form the walls of the chamber; at least one of the panels being of transparent material and forming a side of the chamber being slidably movable within said channels relative to the frame to make an opening in the frame through which a welding rod or welding gun is able to be inserted into the space within the chamber.

2. A chamber according to claim 1, additionally including two spaced-apart upwardly-extending channels facing each other, the movable panel being slidable in the channels; a resilient sealing strip extending from end-to-end along each channel and positioned inwardly of the panel, releasable clamping means urging the movable panel towards the sealing strips, thereby compressing the strips and making a seal between the panel and the channels; laterally spaced-apart cross-members extending across from the top of one channel to the top of the other, the movable panel being able to slide between the cross-members; releasable clamping means carried by the cross member adjacent to the outer face of the panel for urging the panel toward the other cross-member, and a longitudinally-extending sealing member being positioned along the length of the side of the said other cross-member for making sealing engagement with the inner face of the panel.

* * * * *